(12) United States Patent
Sullivan et al.

(10) Patent No.: US 11,558,336 B2
(45) Date of Patent: Jan. 17, 2023

(54) SYSTEMS AND METHODS FOR DEVICE SELECTION AND MODIFIED OUTPUT UPON RECEIVING NOTIFICATIONS

(71) Applicant: Rovi Guides, Inc., San Jose, CA (US)

(72) Inventors: Colleen Sullivan, San Jose, CA (US); Benjamin Holms Maughan, Pleasanton, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/254,793

(22) PCT Filed: Dec. 18, 2018

(86) PCT No.: PCT/US2018/066238
§ 371 (c)(1),
(2) Date: Dec. 21, 2020

(87) PCT Pub. No.: WO2020/131035
PCT Pub. Date: Jun. 25, 2020

(65) Prior Publication Data
US 2021/0377202 A1    Dec. 2, 2021

(51) Int. Cl.
*H04L 51/224*    (2022.01)
*G06F 40/205*    (2020.01)
*H04M 3/42*    (2006.01)
*H04W 4/12*    (2009.01)

(52) U.S. Cl.
CPC .......... *H04L 51/224* (2022.05); *G06F 40/205* (2020.01); *H04M 3/42263* (2013.01); *H04W 4/12* (2013.01)

(58) Field of Classification Search
CPC .. H04L 51/24; G06F 40/205; H04M 3/42263; H04W 4/12

USPC .......................................................... 709/206
See application file for complete search history.

(56) References Cited

U.S. PATENT DOCUMENTS

| | | | |
|---|---|---|---|
| 2003/0065805 A1* | 4/2003 | Barnes, Jr. .............. | H04W 4/02 709/231 |
| 2011/0244887 A1* | 10/2011 | Dupray ................ | G01C 21/206 455/456.2 |
| 2015/0350129 A1 | 12/2015 | Cary et al. | |
| 2018/0083899 A1 | 3/2018 | Sumter et al. | |

OTHER PUBLICATIONS

International Search Report and Written Opinion for International Application No. PCT/US2018/066238 dated Oct. 23, 2019.

* cited by examiner

*Primary Examiner* — David R Lazaro
*Assistant Examiner* — Zia Khurshid
(74) *Attorney, Agent, or Firm* — Haley Guiliano LLP

(57) ABSTRACT

Systems and methods are disclosed herein for device selection and modified output upon receiving notifications. In one embodiment of the disclosed technique for selecting an output device for notifications, systems and methods receive an electronic notification which indicate an originator of the electronic notification. An output range is determined for each electronic device in a plurality of electronic devices. The system selects the electronic device with the smallest of determined output ranges from the plurality of electronic devices. The system determines from the indication whether the originator of the electronic notification is on a stored list of originators. If so, the system transmits the electronic notification to the selected electronic device for output.

13 Claims, 8 Drawing Sheets

SYSTEMS AND METHODS FOR DEVICE SELECTION AND MODIFIED OUTPUT UPON RECEIVING NOTIFICATIONS

CROSS-REFERENCE TO RELATED APPLICATION

This application is a United States National Phase Application filed under 35 U.S.C. § 371 of International Patent Application No. PCT/US2018/066238, filed on Dec. 18, 2018 which is hereby incorporated by reference in its entirety.

BACKGROUND

The present disclosure is directed to techniques for maintaining the privacy of received electronic notifications.

SUMMARY

Electronic notifications are a preferred method of electronic communication with the amount of electronic notification constantly increasing. These notifications are being used in a variety of different manners from a variety of parties (e.g., work, family, ecommerce, school, medical, etc.) Each one of these parties may have respective privacy relationships to a specific user. If the user is inundated with notifications for these parties on a consistent basis, without a privacy scheme to efficiently view the notifications in a manner that is congruent with specific privacy settings, keeping up with the stream of notifications may become unwieldy using conventional approaches. Another challenge for maintaining the privacy of received notifications owes to users having multiple devices. For example, a user may possess a smartphone and a laptop, and the selection for determining which device receives notifications must take into account privacy considerations.

Accordingly, systems and methods are disclosed herein for device selection and modified output upon receiving notifications. In one embodiment of the disclosed technique for selecting an output device for notifications, systems and methods receive an electronic notification which indicate an originator of the electronic notification. An output range is determined for each electronic device in a plurality of electronic devices. The system selects the electronic device with the smallest output range from the plurality of electronic devices. The system determines from the indication whether the originator of the electronic notification is on a stored list of originators. If so, the system transmits the electronic notification to the selected electronic device for output.

In another embodiment of the disclosed technique for selecting an output device for notifications, systems and methods receive an electronic notification which includes content. An output range is determined for each electronic device in a plurality of electronic devices. The system selects the electronic device with the smallest determined output range from the plurality of electronic devices. The system then parses the content of the electronic notification to identify one or more words within the content. The system compares the identified one or more words to a stored list of words to detect a match. If a match is detected, the system transmits the electronic notification to the selected electronic device for output.

In another embodiment of the disclosed technique for outputting electronic notifications, systems and methods receive an electronic notification which includes an indication of an originator of the electronic notification. An output range defining a coverage area is determined by the system. The system then detects whether a person in addition to an intended recipient of the notification is within the coverage area. If so, the system scales the output of the electronic notification for output to an area of the coverage area having no person other than the intended recipient. In some embodiments, if a person in addition to an intended recipient is within the coverage area, the system transmits an alert to the electronic device.

In some embodiments, the electronic notification is sent in audio format and the determination of the output range includes determining an audio output decibel level of each electronic device. The system then selects an electronic device from the plurality of electronic devices having the lowest audio output decibel level. In other embodiments, the electronic notification is sent in visual format (e.g., text and/or picture) and the determination of the output range includes determining a notification output size of each electronic device. The system then selects an electronic device having the smallest notification output size.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
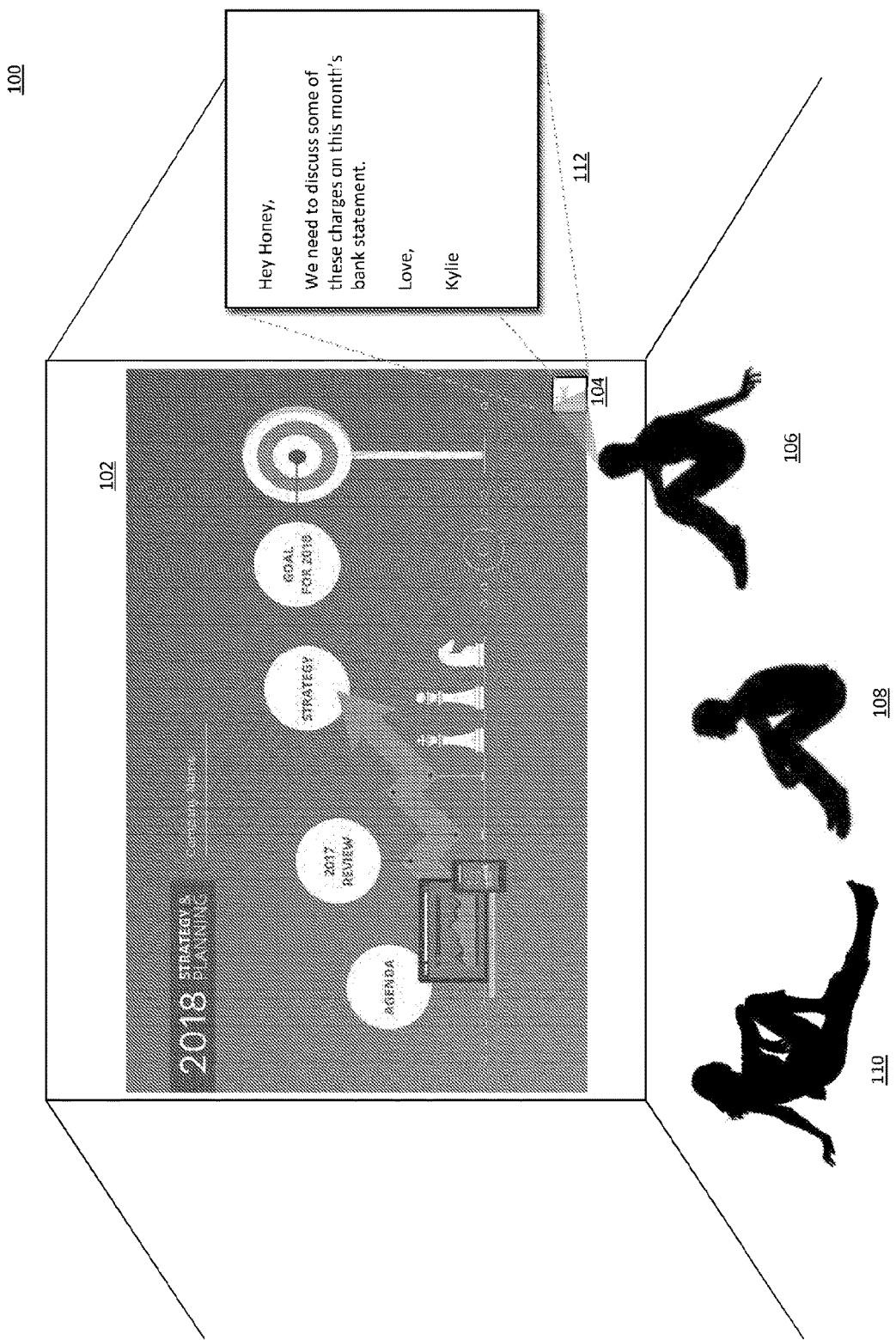
FIG. 1 shows an illustrative diagram of a shared display with scaled output for a notification, in accordance with some embodiments of the disclosure.

FIG. 1 shows an illustrative diagram 100 of a shared display with scaled output for a notification, in accordance with some embodiments of the disclosure. In this example, coworkers are having a strategy session in relation to work product in a meeting room.

In the current example, the presenter 106 receives an electronic notification on an instant messaging platform through his personal computer. The instant message from a user account associated with the presenter's wife (e.g., indication of an originator of the electronic notification). The instant message may be any type of electronic message including text, audio, video, Graphics Interchange Format (GIF), emojis, animated text messages, animated voice messages, transcribed voice messages, documents, executables, links, or other type of electronic data. In this scenario, the instant message is textual that reads "Hey Honey, We need to discuss some of these charges on this month's bank statement! Love, Kylie." The notification privacy server determines the output range of the projector. The shared display 102 is a projector which is projecting from the personal computer of presenter 106. Other coworkers of presenter are in the room, namely coworker 110 and coworker 108. The subject matter being projected is work product. A notification privacy server evaluates all incoming notifications and outputs the notifications based on device selection and modified output based on various disclosed techniques herein. In this situation the output comprises the entire wall of the meeting room (e.g., 12' tall by 20' wide). The notification privacy server then determines whether a person, in addition to an intended recipient of the notification, is within the coverage area.

A variety of techniques are disclosed herein for determining who the intended recipient is. In some embodiments, the user account addressed comprises the persons for which the notification was intended. In this example, because the instant message was from the presenter's wife Kylie to only the presenter, the intended recipient would be only the presenter. This may be augmented with additional rules where work related emails may be assigned a ruleset which allows for a select group of coworkers to be within a permissive group such that even if the coworkers are not expressly addressed in a work related email, they are considered intended recipients as per the ruleset. In other embodiments, the information within the electronic notification itself is analyzed for content to determine whether it may be shared with people other than the person directly addressed by the electronic notification.

Returning to the current example, the only intended recipient would be the presenter. To detect whether an additional person is within the coverage area, a variety of suitable techniques may be employed. In one example, monitoring devices such as motion sensors, cameras, or other visual based detectors may be utilized to visually inspect the vicinity of the coverage range to determine whether one or more people are within range. In another example, the notification privacy server may receive logins from various network devices of all people within the vicinity of the coverage range. Based on the locations of the network devices, the locations of the persons may be approximated. In another example, the notification privacy server receives a list of people participating in the vicinity of the coverage area. In this current example, the projector has a secondary visual camera which can send a visual representation of people within the coverage area to the notification privacy server. The notification privacy server utilizing image recognition techniques to identify the people within the coverage area. The notification privacy server determines that coworkers 108 and 110 are within the coverage area and can view the display.

Upon determining that the coworkers are present within the coverage area in addition to the presenter, the notification privacy server scales the output of the electronic notification to an area of the coverage area having no person other than the intended recipient. The electronic notification is scaled to a size 104 such that only presenter 106 can read the message as coworkers 108 and 110 are in excess of six feet away from presenter 106. Scaling the output may be calculated using a variety of techniques. In some embodiments, the same techniques for determining persons in the coverage area can be used to determine calculations on the amount of scaling and orientation of the electronic notification. In the current example, the coworkers 108 and 110 are to the left of presenter 106, and thus the orientation of far right is selected as presenter is closest to far right. Additionally, given that the closest coworker is in excess of six feet away, the size of the text may be of a generous size as the closet coworker could still not view the text based on a normal tolerance of vision. In some embodiments, if the additional persons change position within a defined threshold from the position at which the initial calculation of additional person within the coverage area was made, the notification may be removed from the shared screen. In this way, the notification privacy server can guard against unwanted viewing of private material. In some embodiments, the notification is always sent to a designated area of the coverage screen for predictability. For instance, the notifications may already be sent to bottom right of the coverage area. This may be advantageous when the audience is further away from the coverage area and the specific calculations for each person, beyond the presenter are less important to preserve privacy.

In some embodiments, in addition to the output being scaled for output, the intended recipient may be sent an alert for the notification on a separate electronic device (e.g., the intended recipient's smartphone). The alert may provide option to remove from the electronic device with scaled output such that the intended recipient can view the electronic notification on the separate electronic device. The alert may be a vibration, instant message, SMS, email, or other mode of alert for an electronic device.

Determination of output range may vary depending on the type of electronic device. If the electronic device is an audio device, the output range for the electronic device includes determining an audio output decibel level for the device. The output decibel level may be determined by information retrieved from the electronic device itself. In other embodiments, the output decibel level may be retrieved from a central database having information regarding various consumer electronic devices/industrial electronic devices. Upon determining the decibel output level, the scaling the output of the electronic notification for output to an area of the coverage area having no person other than the intended recipient includes selecting an electronic device from the plurality of electronic devices having the lowest audio output decibel level. In this way, privacy is maintained by allowing the intended recipient to hear the audio based electronic notification without allowing other people within the coverage range to hear. Calculations for scaling may include determination of distance and calculating the scaled output based on the distance between the electronic device, the intended recipient, and one or more people who are not the intended recipient by calculating adjustment of decibel level with distance. For example, the decibel level will be adjusted based on distance such that the intended recipient can hear the electronic notification while the distance of the one or more people within the coverage area is taken into account for calculation of a decibel level such that they cannot hear the electronic notification based on a standard human decibel hearing response (e.g., the range deemed practically inaudible may be configured at 0-15 decibels). Distance of the intended recipient to the electronic device may be determined by monitoring equipment (e.g., cameras, motion sensors, etc.).

If the intended recipient has a louder than average reception volume to aid poor hearing on their electronic device, the scaling will be larger as to provide enhanced decibel level for the intended recipient. In some embodiments, if the decibel level is increased to a level whereby it exceeds an public audible threshold, the notification will not be delivered as to preserve the privacy. This may occur is the vicinity is in a public area. The determination of the location may be provided to the notification privacy server by locational GPS information and/or metadata of the current location. The public audible threshold may also be exceeded if a person within the coverage area changes position to a position where the notification would be plainly audible. This may be determined by the notification privacy server receiving information from monitoring devices and/or user equipment devices such as strength of Bluetooth antennas on a user's smartphone relative to the electronic device.

If the electronic device is configured to generate visuals for display, the output range for the electronic device includes determining a notification output size of the electronic device. The notification output size may be determined by information retrieved from the electronic device itself. In other embodiments, the notification output size may be retrieved from a central database having information regarding various consumer electronic devices/industrial electronic devices. For example, the notification privacy server may retrieve information for a user's smartphone from the device itself which provides data stating that the smartphone has a 5" screen size which provides for a maximum view of 5".

Upon determining the notification output size, the scaling the output of the electronic notification for output to an area of the coverage area having no person other than the intended recipient includes selecting an electronic device from the plurality of electronic devices having the smallest notification output size. In this way, privacy is maintained by allowing the intended recipient to see the electronic notification without allowing other people within the coverage range to see. To calculate the scaling factor, the notification privacy server retrieves the relative distance of the intended recipient to the electronic device. The notification privacy server further receives information regarding environmental conditions (e.g., lighting, other visual obstructions) and also retrieves if other personnel are within the coverage area (e.g., via motion sensors, camera, etc.). Based on these variables, the notification privacy server, by processing circuitry, may calculate the optimal scaling factor based on readable text size from the distance of the intended recipient to the electronic device.

Further augmentation to the calculation for scaling may be implemented based on whether the electronic notification is text based, and/or visual based. In visual based electronic notifications (e.g., text, video, Graphics Interchange Format (GIF), emojis, animated text message, animated voice message, transcribed voice message, document, executable, link, etc.), the scaling factor will likely be enhanced as personnel may detect patterns from further away than reading text. In some embodiments, the text size may be adapted for the specific intended recipient based on preferences on the user device. For example, if the intended recipient has enlarged text setting selected on their electronic device, the scaling will be larger as to provide enhanced readability for the intended recipient. In some embodiments, if the text size is increased to a size whereby it exceeds a visibility threshold, the notification will not be delivered as to preserve the privacy. This may occur is the vicinity is in a public area. The determination of the location may be provided to the notification privacy server by locational GPS information and/or metadata of the current location. The visibility threshold may also be exceeded if a person within the coverage area changes position to a position where the notification would be plainly readable. This may be determined by the notification privacy server receiving information from monitoring devices and/or user equipment devices such as strength of Bluetooth antennas on a user's smartphone relative to the electronic device.

Figure 2A:
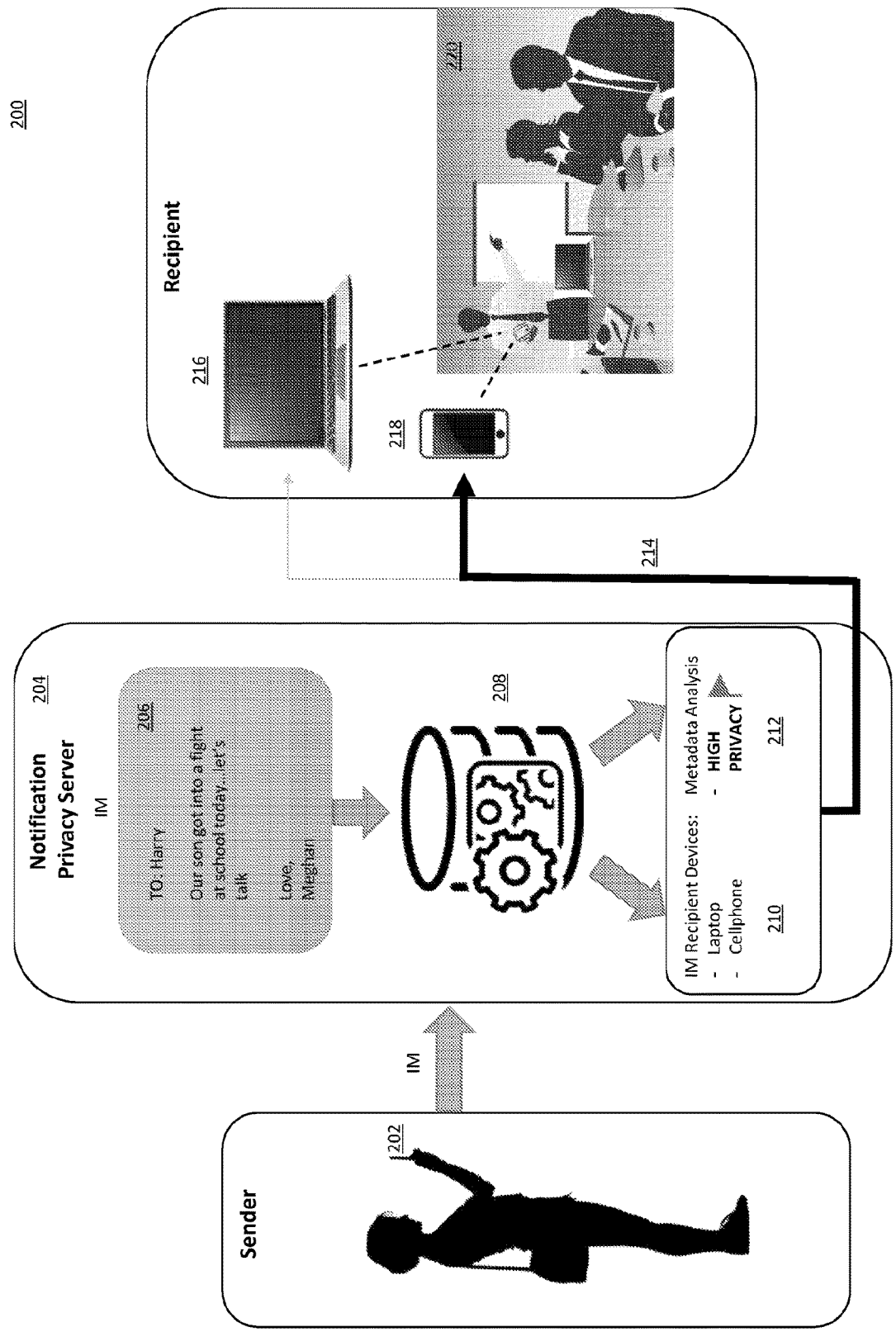
FIG. 2A shows an illustrative diagram of device selection for a notification, in accordance with some embodiments of the disclosure.

FIG. 2A shows an illustrative diagram 200 of device selection for a notification, in accordance with some embodiments of the disclosure. In this example, a sender, Meghan, is sending an electronic notification via instant message to the recipient which is her husband, Harry.

Meghan uses her smartphone 202 to send the instant message which is received by the notification privacy server 204 and sent to Harry's smartphone 218. Harry is currently at work in a meeting room 220 presenting to coworkers using his personal laptop 216 which is being projected on a screen. Other coworkers are within Harry's vicinity and can view the projected display.

In one implemented technique for selecting an output device for notifications, the notification privacy server receives an electronic notification comprising an indication of an originator of the electronic notification. In this example, the instant message has originator listed as Meghan's smartphone using Meghan's phone number as an indication of sender. The notification privacy server determines an output range 208 for each electronic device of a plurality of electronic devices. Continuing with this example, Harry has two electronic devices 210, namely his personal laptop 216 and his smartphone 218. The type of electronic notification is text based, thus the output range is based on the notification output size of each electronic device. The smartphone has a five-inch screen whilst the projected personal laptop has a four-by-four-foot screen. Thus, given the smartphone has the smallest of the determined output ranges, the smartphone is the selected device.

The notification privacy server then determines whether Meghan is on a stored list of originators for Harry. The stored list of originators may be automatically generated by the smartphone software based on various techniques. In other embodiments, the stored list of originators is manually configured by the user of the device (e.g., Harry). The notification privacy server determines from the indication, the originator. The indication may be a phone number, metadata, hidden data, overt information within the electronic notification which is parsed, retrieved from a second source, etc. In this case, Harry has manually added his wife Meghan to his list of "private users" which is his stored list of originators. Because the message was sent from the phone number, an indication of Meghan, the notification privacy server knows the originator is Meghan. Because Meghan is on this stored list of originators, the notification privacy server transmits the instant message to the smartphone.

In some embodiments, in the scenario where the notification privacy server determines that the originator is not stored on a list of originators, the notification privacy server would not exclusively select the electronic device of the plurality of electronic devices having an output range that is the smallest of the determined output ranges.

In another implemented technique for selecting an output device for notifications, the notification privacy server receives an electronic notification comprising content. In this example, the instant message comprises the content "Our son got into a fight at school today . . . let's talk Love, Meghan." The notification privacy server determines an output range 208 for each electronic device of a plurality of electronic devices. Continuing with this example, Harry has two electronic devices 210, namely his personal laptop 216 and his smartphone 218. The type of electronic notification is text based, thus the output range is based on the notification output size of each electronic device. The smartphone has a five-inch screen whilst the projected personal laptop has a four-by-four-foot screen. Thus, given the smartphone has the smallest of the determined output ranges, the smartphone is the selected device. The notification privacy server then parses the content of the electronic notification to identify one or more words within the content. Continuing with this example, the parsing technique identifies the words "son", "fight", and "love" which all match a stored list of words. The stored list of words may be preconfigured for trigger words which are indicative of heightened privacy or sensitivity. The stored list of words may be manually configured by the recipient of electronic notifications to add his own trigger words which he deems highly private such as the names of his children, etc. The notification privacy server determines if one or more parsed words from the electronic notification match at least one word from the stored list of words. If so, the notification privacy server transmits the electronic notification to the selected electronic device for output. In this example, because the words "son", "fight", and "love" which all match a stored list of words, the notification privacy server transmits Meghan's instant message to Harry's smartphone.

In some embodiments, upon a determination that one or more parsed words from the electronic notification matches at least one word from the stored list of words, a "High Privacy" metadata flag 212 may be assigned to the electronic notification. In some embodiments, the metadata flag is embedded into the electronic notification. In some embodiments, the metadata flag is sent as a separate notification to the recipient 214.

Figure 2B:
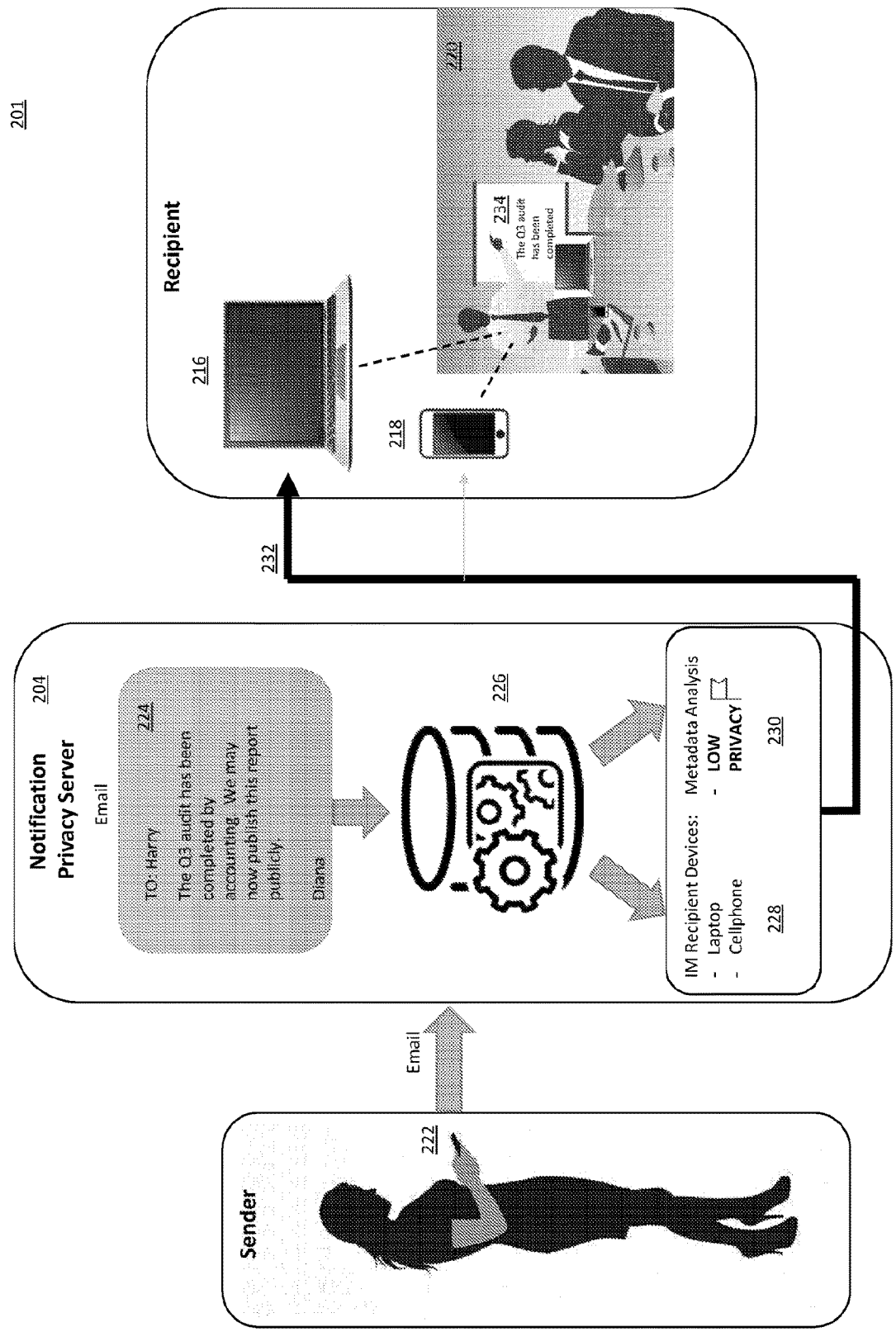
FIG. 2B shows yet another illustrative diagram of device selection for a notification, in accordance with some embodiments of the disclosure.

FIG. 2B shows yet another illustrative diagram 201 of device selection for a notification, in accordance with some embodiments of the disclosure. In this example, a sender Diana is sending an electronic notification via email to the recipient which is her coworker Harry. Diana uses her smartphone 222 to send the email which is received by Harry's personal laptop 216. Harry is currently at work in a meeting room 220 presenting to coworkers using his personal laptop 216 which is being projected on a screen. Other coworkers are within Harry's vicinity and can view the projected display.

In one implemented technique for selecting an output device for notifications, the notification privacy server receives an electronic notification comprising an indication of an originator of the electronic notification. In this example, the instant message has originator listed as Diana's smartphone using Diana's phone number as an indication. The notification privacy server determines an output range for each electronic device of a plurality of electronic devices. Similar to the previous analysis, Harry has two electronic devices 210, namely his personal laptop 216 and his smartphone 218. The type of electronic notification is text based, thus the output range is based on the notification output size of each electronic device. The smartphone has a five-inch screen whilst the projected personal laptop has a four-by-four-foot screen. Thus, given the smartphone has the smallest of the determined output ranges, the smartphone is the selected device. The notification privacy server determines whether Diana is on a stored list of originators for Harry. In this case, Diana is not on a stored list of originators. Because Diana is not on a stored list of originators, the notification privacy server transmits the instant message to the personal laptop which is projected 234. Because the email is work related, the message is not deemed high privacy and is shown to Harry and overseen by his coworkers.

In another implemented technique for selecting an output device for notifications, the notification privacy server receives an electronic notification comprising content. In this example, the instant message comprises the content "The Q3 audit has been completed by accounting. We may now publish this report publicly. Diana." The notification privacy server determines an output range 208 for each electronic device of a plurality of electronic devices. Continuing with this example, Harry has two electronic devices 210, namely his personal laptop 216 and his smartphone 218. The type of electronic notification is text based, thus the output range is based on the notification output size of each electronic device. The smartphone has a five-inch screen whilst the projected personal laptop has a four-by-four-foot screen. Thus, given the smartphone has the smallest of the determined output ranges, the smartphone is the selected device. The notification privacy server then parses the content of the electronic notification to identify one or more words within the content. Continuing with this example, the parsing technique does not identify any words which match a stored list of words. The notification privacy server determines if one or more parsed words from the electronic notification match at least one word from the stored list of words. If so, the notification privacy server transmits the electronic notification to the selected electronic device for output. In this example, because no words match a stored list of words, the notification privacy server transmits Diana's instant message to Harry's personal laptop 216 which is projected on screen 234 while Harry is giving a presentation at work. In some embodiments, the metadata flag is embedded into the electronic notification upon determination that the one or more parsed words from the electronic notification does not match at least one word from the stored list of words. In some embodiments, the metadata flag is sent as a separate notification to the recipient 230 (e.g., "Low Privacy").

Figure 3:
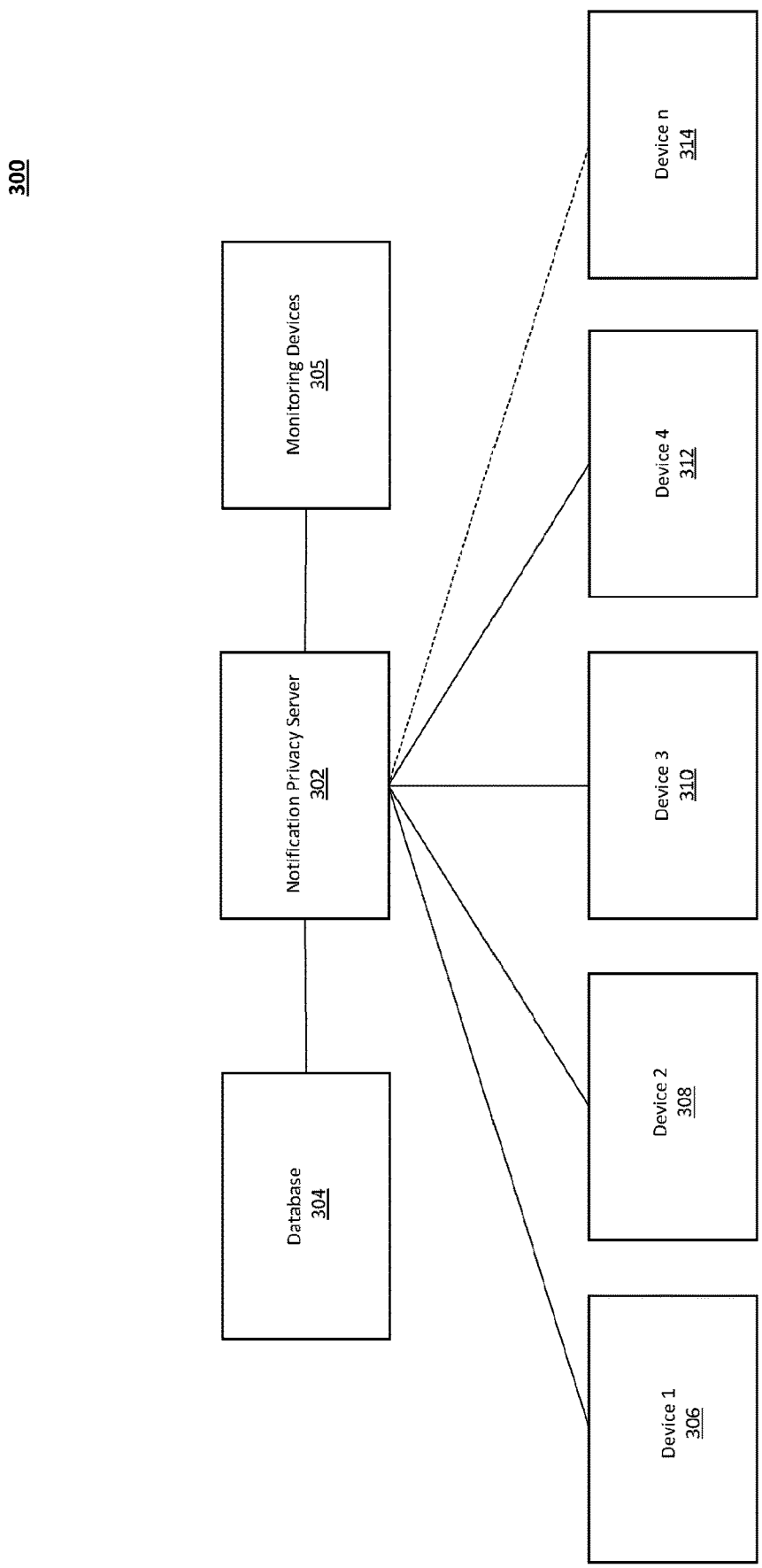
FIG. 3 shows an illustrative system diagram of the notification privacy server, database, and multiple devices, in accordance with some embodiments of the disclosure.
Figure 4:
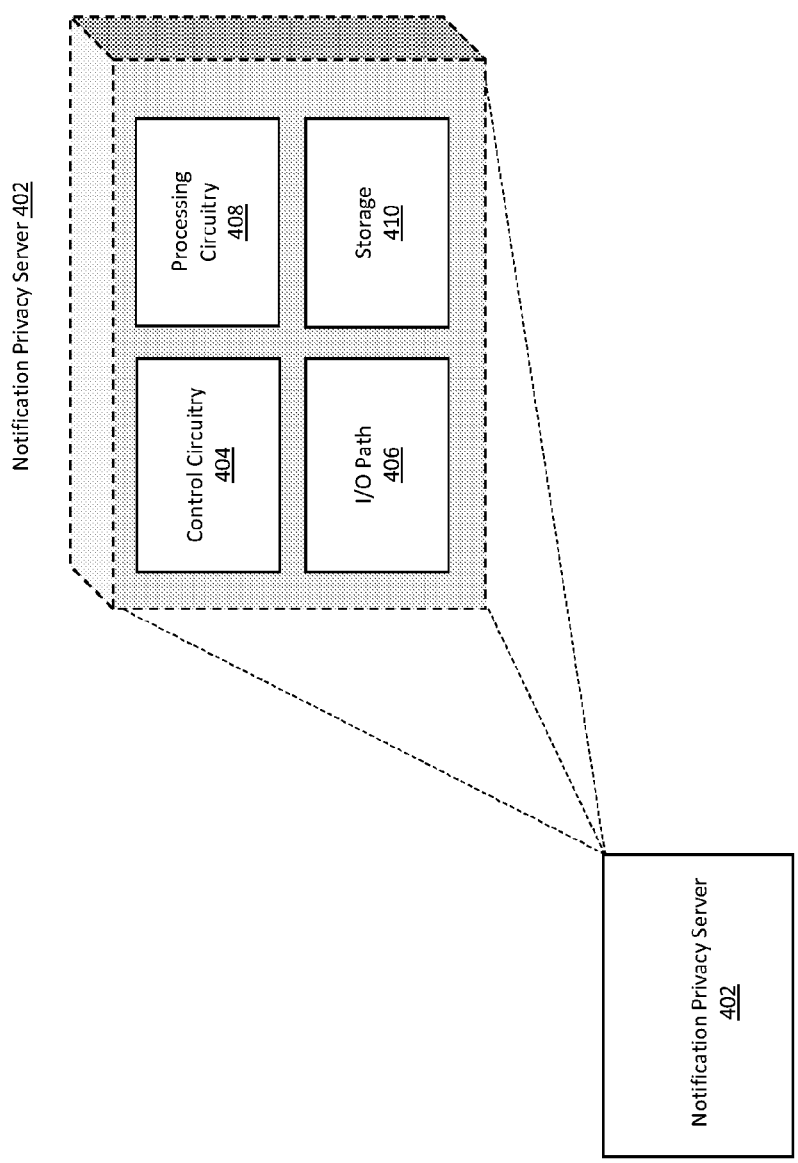
FIG. 4 shows an illustrative block diagram of the notification privacy server, in accordance with some embodiments of the disclosure.

FIG. 3 shows an illustrative system diagram of the notification privacy server, database, monitoring devices, and multiple devices, in accordance with some embodiments of the disclosure. The notification privacy server 302 may be of any hardware which provides for the functionality of the disclosed techniques for device selection and modified output upon receiving notifications. The notification privacy server may be communicatively coupled to multiple devices (e.g., device 1 (306), device 2 (308), device 3 (310), device 4 (312), device n (314)). The notification privacy server may be communicatively coupled to a database 304. The notification privacy server may be communicatively coupled to monitoring devices 305. A further detailed disclosure on the notification privacy server can be seen in FIG. 4 showing an illustrative block diagram of the notification privacy server, in accordance with some embodiments of the disclosure.

The devices in the defined environment (e.g., device 1 (306), device 2 (308), device 3 (310), device 4 (312), device n (314)) may be any device which have send and/or receive functionality for electronic notifications. In various systems, devices can include, but are not limited to, network-connected devices (e.g., Internet-of-Things devices), smartphones, personal computers, smart appliances, consumer electronics, and similar systems. The state change of the device is detected by the notification privacy server through a communication means (e.g., network connection, Bluetooth, near field communication, cellular network, Wi-Fi, or any other communicative means).

The database 304 may be any database, server, computing device which contains memory for storing various types of information retrieved by the notification privacy server. In some embodiments, the database stores at least one of the stored list of originators and stored list of words.

The monitoring devices 305 may be devices which determine whether a person other than the intended recipient are within the coverage area. For example, monitoring devices may include, but are not limited to motion sensors, cameras, or other visual based detectors that may be utilized to visually inspect the vicinity of the coverage range to determine whether one or more people are within range.

FIG. 4 shows an illustrative block diagram 400 of the notification privacy server 402, in accordance with some embodiments of the disclosure. In some embodiments, the notification privacy server may be communicatively connected to a user interface. In some embodiments, the notification privacy server may include processing circuitry, control circuitry, and storage (e.g., RAM, ROM, hard disk, removable disk, etc.). The notification privacy server may include an input/output path 406. I/O path 406 may provide device information, or other data over a local area network (LAN) or wide area network (WAN), and/or other content and data to control circuitry 404, which includes processing circuitry 408 and storage 410. Control circuitry 404 may be used to send and receive commands, requests, and other suitable data using I/O path 406. I/O path 406 may connect control circuitry 404 (and specifically processing circuitry 408) to one or more communications paths.

Control circuitry 404 may be based on any suitable processing circuitry such as processing circuitry 408. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a notification privacy server stored in memory (i.e., storage 410).

Memory may be an electronic storage device provided as storage 410 which is part of control circuitry 404. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g., to launch a boot-up routine and other instructions).

The notification privacy server 402 may be coupled to communications network. Communications network may be one or more networks including the Internet, a mobile phone network, mobile voice or data network (e.g., a 4G or LTE network), cable network, public switched telephone network, or other types of communications network or combinations of communications networks. Paths may separately or together include one or more communications paths, such as, a satellite path, a fiber-optic path, a cable path, a path that supports Internet communications, free-space connections (e.g., for broadcast or other wireless signals), or any other suitable wired or wireless communications path or combination of such paths.

Figure 5:
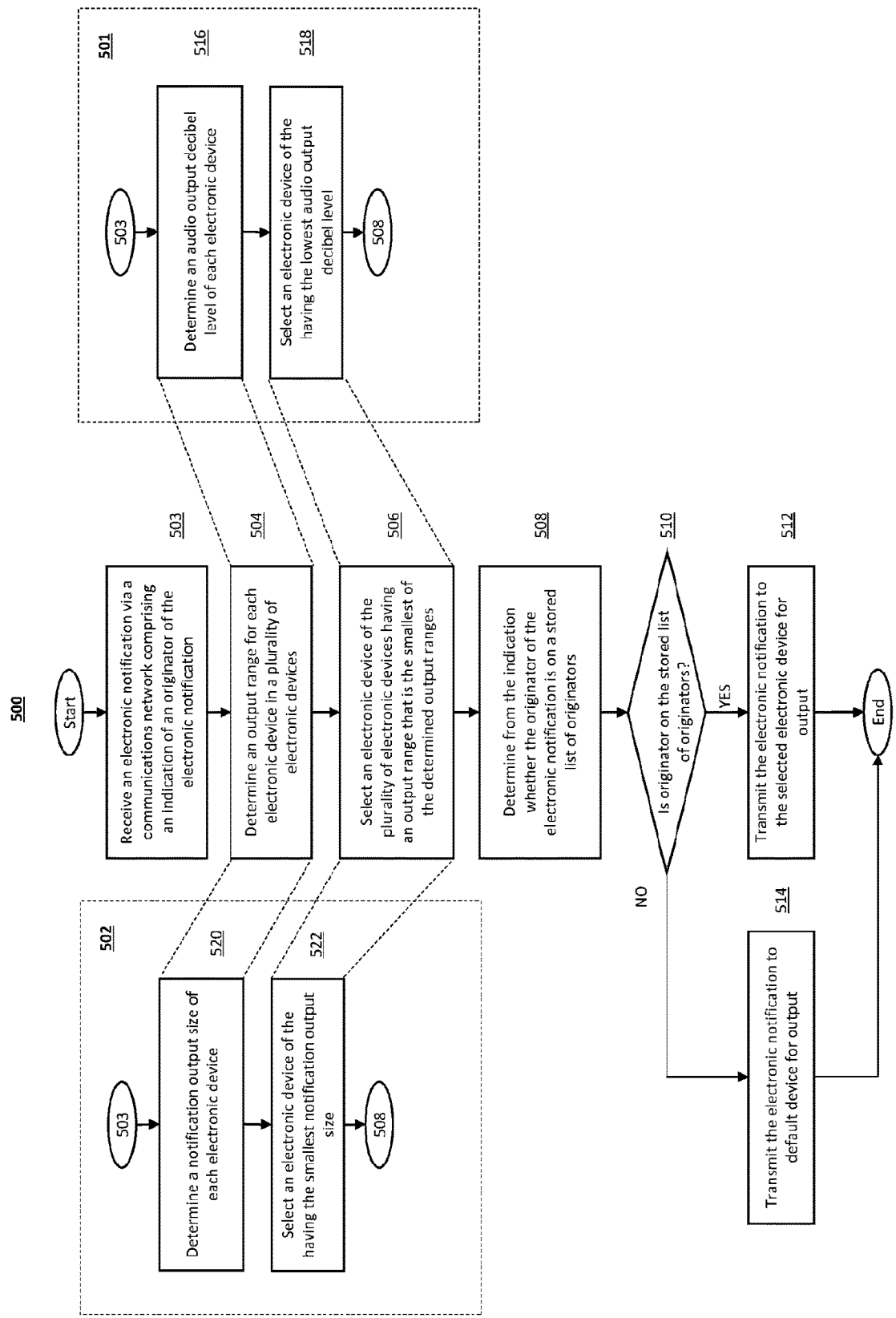
FIG. 5 is an illustrative flowchart of a process for selecting an output device for notifications, in accordance with some embodiments of the disclosure.

FIG. 5 is an illustrative flowchart of a process for selecting an output device for notifications, in accordance with some embodiments of the disclosure. Process 500, and any of the following processes, may be executed by control circuitry 404 (e.g., in a manner instructed to control circuitry 404 by the notification privacy server). Control circuitry 404 may be part of notification privacy server 402, or of a remote server separated from the notification privacy server by way of communication network, or distributed over a combination of both.

At 503, the notification privacy server, by control circuitry 404, receives an electronic notification via a communications network. The electronic notification comprises an indication of an originator of the electronic notification. The notification privacy server may receive the electronic notification through the I/O path 406.

At 504, the notification privacy server, by control circuitry 504, determines an output range for each electronic device in a plurality of electronic devices. In some embodiments, the output range may be retrieved from storage 410 within the notification privacy server 402. In other embodiments, the notification privacy server 302 may retrieve the device information used to determine the output range from the devices (306-314). In yet other embodiments, the notification privacy server 302 may retrieve the device information used to determine the output range from the database 304. The output range may be determined using processing circuitry 408.

At 506, the notification privacy server, by control circuitry 404, selects an electronic device of the plurality of electronic devices having an output range that is the smallest of the determined output ranges.

In some embodiments, the determination of the output range and selection of an electronic device may be implemented by sub-process 501. At 516, the notification privacy server, by control circuitry 404, determines an output range for each electronic device in a plurality of electronic devices by determining an audio output decibel level of each electronic device. In some embodiments, the audio output decibel level may be retrieved from storage 410 within the notification privacy server 402. In other embodiments, the notification privacy server 302 may retrieve the audio output decibel level from the devices (306-314). In yet other embodiments, the notification privacy server 302 may retrieve the audio output decibel level from the database 304. The audio output decibel level may be determined using processing circuitry 408.

At 518, the notification privacy server, by control circuitry 404, selects an electronic device of the plurality of electronic devices having the output range that is the smallest of the determined output ranges comprises selecting an electronic device from the plurality of electronic devices having the lowest audio output decibel level. The selection of the electronic device may be determined using processing circuitry 408.

In other embodiments, the determination of the output range and selection of an electronic device may be implemented by sub-process 502. At 520, the notification privacy server, by control circuitry 404, determines an output range for each electronic device in a plurality of electronic devices comprises determining a notification output size of each electronic device. In some embodiments, the notification output size may be retrieved from storage 410 within the notification privacy server 402. In other embodiments, the notification privacy server 302 may retrieve the notification output size from the devices (306-314). In yet other embodiments, the notification privacy server 302 may retrieve the notification output size from the database 304. The notification output size of each electronic device may be determined using processing circuitry 408.

At 522, the notification privacy server, by control circuitry 404, selects an electronic device of the plurality of electronic devices having the output range that is the smallest of the determined output ranges comprises selecting an electronic device from the plurality of electronic devices having the smallest notification output size. The selection of the electronic device may be determined using processing circuitry 408.

At 508, the notification privacy server, by control circuitry 404, determines from the indication whether the originator of the electronic notification is on a stored list of originators. In some embodiments, the stored list may be retrieved from storage 410 within the notification privacy server 402. In other embodiments, the notification privacy server 302 may retrieve the stored list from one or more of the devices (306-314). In yet other embodiments, the notification privacy server 302 may retrieve the stored list from the database 304. If, at 510, control circuitry 404 determines "No," the originator of the electronic notification is not on a stored list of originators, the process advances to 514. At 514, the notification privacy server, by control circuitry 404, transmits the electronic notification to a default device for output.

If, at 510, control circuitry determines "Yes," the originator of the electronic notification is on a stored list of originators, the process advances to 512. At 512, control circuitry 404 transmits the electronic notification to the selected electronic device for output. The notification privacy server 402 transmits the electronic notification using the I/O path 406.

Figure 6:
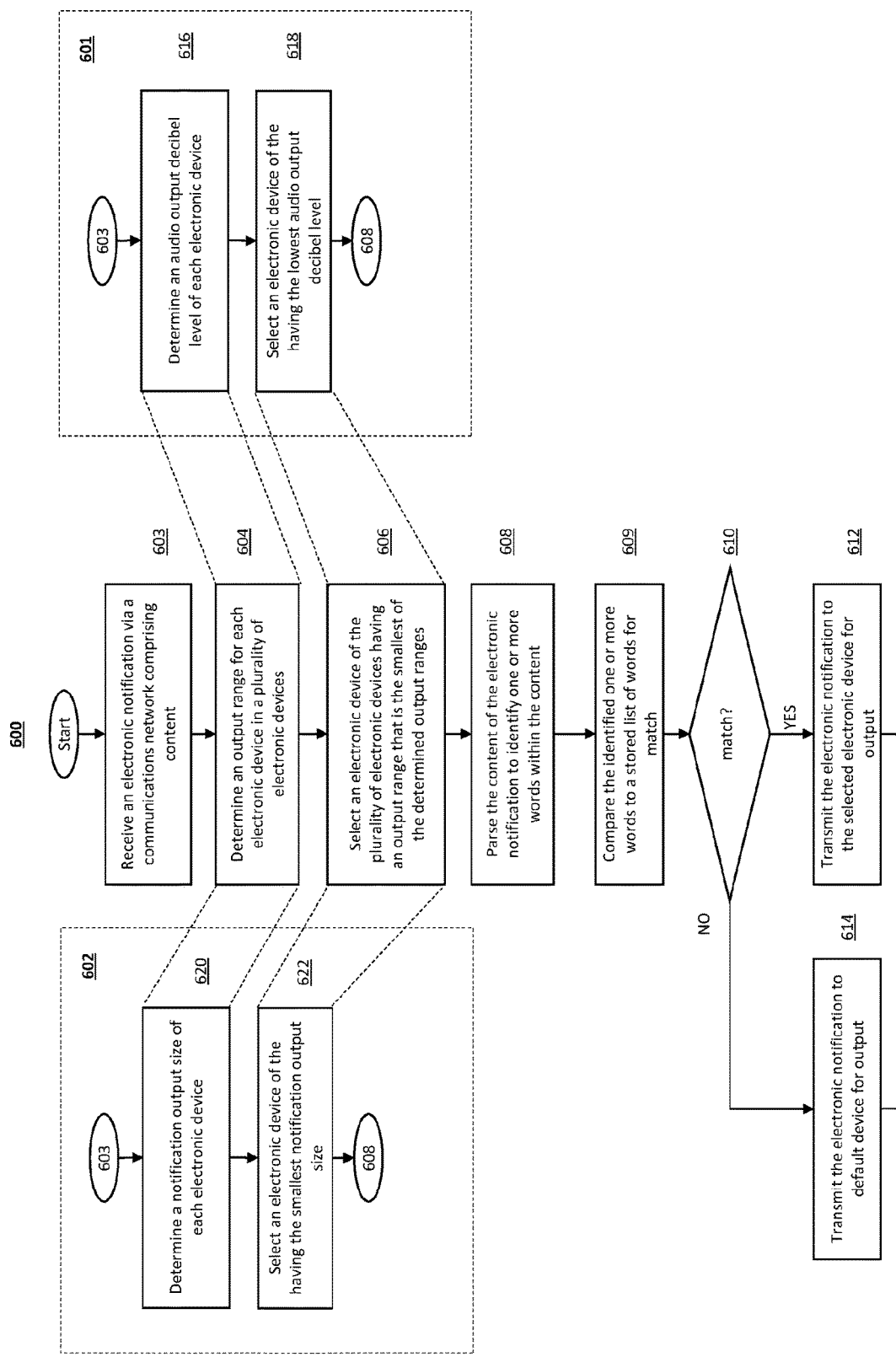
FIG. 6 is an illustrative flowchart of another process for selecting an output device for notifications, in accordance with some embodiments of the disclosure.

FIG. 6 is an illustrative flowchart of another process for selecting an output device for notifications, in accordance with some embodiments of the disclosure. At 603, the notification privacy server, by control circuitry 404, receives an electronic notification via a communications network. The electronic notification comprises content. The notification privacy server may receive the electronic notification through the I/O path 406.

At 604, the notification privacy server, by control circuitry 504, determines an output range for each electronic device in a plurality of electronic devices. In some embodiments, the output range may be retrieved from storage 410 within the notification privacy server 402. In other embodiments, the notification privacy server 302 may retrieve the device information used to determine the output range from the devices (306-314). In yet other embodiments, the notification privacy server 302 may retrieve the device information used to determine the output range from the database 304. The output range may be determined using processing circuitry 408.

At 606, the notification privacy server, by control circuitry 404, selects an electronic device of the plurality of electronic devices having an output range that is the smallest of the determined output ranges.

In some embodiments, the determination of the output range and selection of an electronic device may be implemented by sub-process 601. At 616, the notification privacy server, by control circuitry 404, determines an output range for each electronic device in a plurality of electronic devices by determining an audio output decibel level of each electronic device. In some embodiments, the audio output decibel level may be retrieved from storage 410 within the notification privacy server 402. In other embodiments, the notification privacy server 302 may retrieve the audio output decibel level from the devices (306-314). In yet other embodiments, the notification privacy server 302 may retrieve the audio output decibel level from the database 304. The audio output decibel level may be determined using processing circuitry 408.

At 618, the notification privacy server, by control circuitry 404, selects an electronic device of the plurality of electronic devices having the output range that is the smallest of the determined output ranges comprises selecting an electronic device from the plurality of electronic devices having the lowest audio output decibel level. The selection of the electronic device may be determined using processing circuitry 408.

In other embodiments, the determination of the output range and selection of an electronic device may be implemented by sub-process 602. At 620, the notification privacy server, by control circuitry 404, determines an output range for each electronic device in a plurality of electronic devices comprises determining a notification output size of each electronic device. In some embodiments, the notification output size may be retrieved from storage 410 within the notification privacy server 402. In other embodiments, the notification privacy server 302 may retrieve the notification output size from the devices (306-314). In yet other embodiments, the notification privacy server 302 may retrieve the notification output size from the database 304. The notification output size of each electronic device may be determined using processing circuitry 408.

At 622, the notification privacy server, by control circuitry 404, selects an electronic device of the plurality of electronic devices having the output range that is the smallest of the determined output ranges comprises selecting an electronic device from the plurality of electronic devices having the smallest notification output size. The selection of the electronic device may be determined using processing circuitry 408.

At 608, the notification privacy server, by control circuitry 404, parses the content of the electronic notification to identify one or more words within the content. In some embodiments, the parsing is executed by the processing circuitry 408.

At 609, the notification privacy server, by control circuitry 404, compares the identified one or more words to a stored list of words. In some embodiments, the stored list of words may be retrieved from storage 410 within the notification privacy server 402. In other embodiments, the notification privacy server 302 may retrieve the stored list of words from the devices (306-314). In yet other embodiments, the notification privacy server 302 may retrieve the stored list of words from the database 304. If, at 610, control circuitry 404 determines "No," the one or more words do not match at least one word from the stored list of words, the process advances to 614. At 614, the notification privacy server, by control circuitry 404, transmits the electronic notification to a default device for output.

If, at 610, control circuitry determines "Yes," the one or more words match at least one word from the stored list of words, the process advances to 612. At 612, control circuitry 404 transmits the electronic notification to the selected electronic device for output. The notification privacy server 402 transmits the electronic notification using the I/O path 406.

Figure 7:
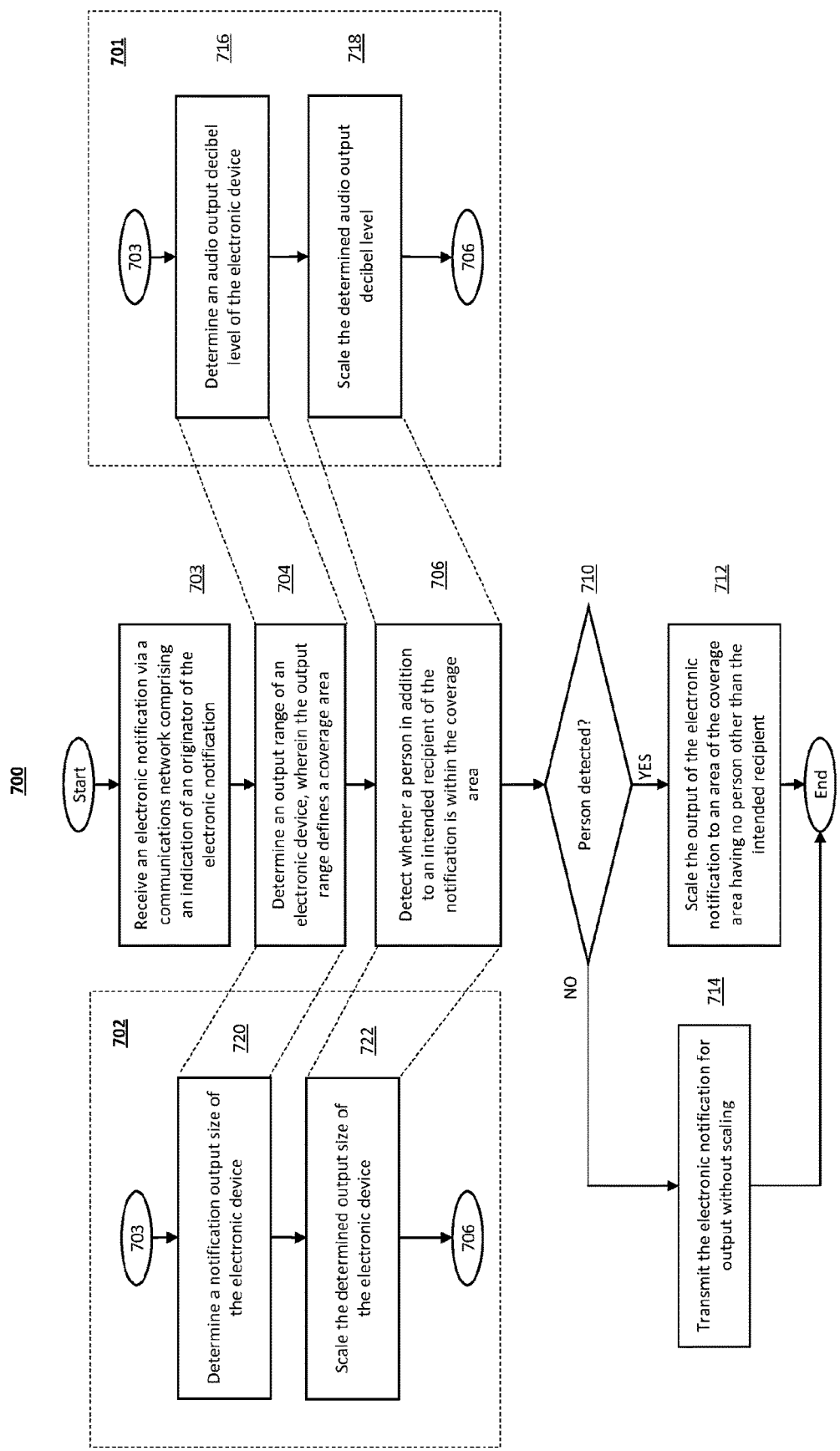
FIG. 7 is an illustrative flowchart of a process for outputting electronic notifications, in accordance with some embodiments of the disclosure.

FIG. 7 is an illustrative flowchart of a process for outputting electronic notifications, in accordance with some embodiments of the disclosure. At 703, the notification privacy server, by control circuitry 404, receives an electronic notification via a communications network. The electronic notification comprises an indication of an originator of the electronic notification. The notification privacy server may receive the electronic notification through the I/O path 406.

At 704, the notification privacy server, by control circuitry 504, determines an output range of an electronic device. The output range defines a coverage area. In some embodiments, the output range may be retrieved from storage 410 within the notification privacy server 402. In other embodiments, the notification privacy server 302 may retrieve the device information used to determine the output range from the devices (306-314). In yet other embodiments, the notification privacy server 302 may retrieve the device information used to determine the output range from the database 304. The output range may be determined using processing circuitry 408.

In some embodiments, the determination of the output range may be implemented by sub-process 701. At 716, the notification privacy server, by control circuitry 404, determines an output range for the electronic device by determining an audio output decibel level of the electronic device. In some embodiments, the audio output decibel level may be retrieved from storage 410 within the notification privacy server 402. In other embodiments, the notification privacy server 302 may retrieve the audio output decibel level from the devices (306-314). In yet other embodiments, the notification privacy server 302 may retrieve the audio output decibel level from the database 304. The audio output decibel level may be determined using processing circuitry 408. At 718, the notification privacy server, by control circuitry 404, scales the output of the electronic notification for output to an area of the coverage area having no person other than the intended recipient comprises scaling the determined audio output decibel level.

In other embodiments, the determination of the output range may be implemented by sub-process 702. At 720, the notification privacy server, by control circuitry 404, determines an output range for the electronic device by determining a notification output size of each electronic device. In some embodiments, the notification output size may be retrieved from storage 410 within the notification privacy server 402. In other embodiments, the notification privacy server 302 may retrieve the notification output size from the devices (306-314). In yet other embodiments, the notification privacy server 302 may retrieve the notification output size from the database 304. The notification output size of the electronic device may be determined using processing circuitry 408. At 722, the notification privacy server, by control circuitry 404, scales the output of the electronic notification for output to an area of the coverage area having no person other than the intended recipient comprises scaling the determined notification output size.

At 706, the notification privacy server, by control circuitry 404, detects whether a person in addition to an intended recipient of the notification is within the coverage area. In some embodiments, data regarding whether a person is within the coverage area is retrieved by the notification privacy server 302 from the monitoring devices 305 (e.g., camera, motion sensor, etc.) through the I/O path 406. If, at 710, control circuitry 404 determines "No," a person in addition to an intended recipient of the notification is not within the coverage area, the process advances to 714. At 714, the notification privacy server, by control circuitry 404, transmits the electronic notification without scaling the output.

If, at 710, control circuitry determines "Yes," a person in addition to an intended recipient of the notification is within the coverage area, the process advances to 712. At 712, notification privacy server, by control circuitry 404, scales the output of the electronic notification for output to an area of the coverage area having no person other than the intended recipient. In some embodiments, the notification privacy server 302 retrieves data for scaling (e.g., distance data of the detected person relative to the device for output) from the monitoring devices 305. In other embodiments, the notification privacy server 302 retrieves data for scaling from the database 304. In yet other embodiments, the notification privacy server 302 may retrieve data for scaling from the devices (306-314). In yet other embodiments, the notification privacy server 402 may retrieve data for storage 410. All data retrieval may be retrieved by the notification privacy server 402 using the I/O path 406. Scaling the output of the electronic notification for output of the electronic device may be performed using processing circuitry 408.

It is contemplated that the steps or descriptions of FIGS. 5-7 may be used with any other embodiment of this disclosure. In addition, the steps and descriptions described in relation to FIGS. 5-7 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 3-4 could be used to perform one or more of the steps in FIGS. 5-7.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for selecting an output device for notifications, the method comprising:
   receiving an electronic notification via a communications network, wherein the electronic notification comprises an indication of an originator of the electronic notification;
   determining a notification output size for each electronic device in a plurality of electronic devices, wherein the notification output size indicates a size of a display used for notifications for each of the plurality of electronic devices;
   selecting an electronic device of the plurality of electronic devices based on the determined notification output sizes;

determining from the indication whether the originator of the electronic notification is on a stored list of originators; and in response to determining the originator is on the stored list of originators, transmitting the electronic notification to the selected electronic device for output.

2. The method of claim 1, further comprising:
determining an audio output decibel level of each electronic device, wherein selecting the electronic device of the plurality of electronic devices is based on the determined notification output sizes and the determined audio output decibel levels.

3. The method of claim 1, wherein
the electronic device of the plurality of electronic devices comprises the notification output size that is the smallest of the determined output sizes.

4. A method for selecting an output device for notifications, the method comprising:
receiving an electronic notification via a communications network, wherein the electronic notification comprises content;

determining a notification output size for each electronic device in a plurality of electronic devices, wherein the notification output size indicates a size of a display used for notifications for each of the plurality of electronic devices;

selecting an electronic device of the plurality of electronic devices based on the determined notification output sizes;

parsing the content of the electronic notification to identify one or more words within the content;

comparing the identified one or more words to a stored list of words; and in response to determining the one or more words match at least one word from the stored list of words, transmitting the electronic notification to the selected electronic device for output.

5. The method of claim 4, further comprising
determining an audio output decibel level of each electronic device, wherein and selecting the electronic device of the plurality of electronic devices is based on the determined notification output sizes and the determined audio output decibel levels.

6. The method of claim 4, wherein:
the electronic device of the plurality of electronic devices comprises the notification output size that is the smallest of the determined output sizes.

7. A method for outputting electronic notifications, the method comprising:
receiving an electronic notification via a communications network, wherein the electronic notification comprises an indication of an originator of the electronic notification;

determining a notification output size of an electronic device, wherein notification output size indicates a size of a display of the electronic device;

determining a coverage area, wherein the coverage area is based on the notification output size and indicates an area within a threshold distance of the electronic device;

detecting whether a person in addition to an intended recipient of the notification is within the coverage area; and in response to determining a person in addition to an intended recipient is within the coverage area, scaling the output of the electronic notification for output to a second coverage area, wherein the second coverage area comprises no person other than the intended recipient.

8. The method of claim 7, further comprises:
determining an audio output decibel level of the electronic device, wherein
scaling the output of the electronic notification for output to a second coverage area, wherein the second coverage area comprises no person other than the intended recipient comprises scaling the determined audio output decibel level.

9. The method of claim 7, wherein
scaling the output of the electronic notification for output to a second coverage area, wherein the second coverage area comprises no person other than the intended recipient comprises scaling the size of the notification on the display.

10. The method of claim 7, further comprising:
in response to determining a person in addition to an intended recipient is within the coverage area, transmitting an alert to the electronic device.

11. A system for selecting an output device for notifications, the system comprising:
control circuitry configured to:
receive an electronic notification via a communications network, wherein the electronic notification comprises an indication of an originator of the electronic notification;

determine a notification output size for each electronic device in a plurality of electronic devices, wherein the notification output size indicates a size of a display used for notifications for each of the plurality of electronic devices;

select an electronic device of the plurality of electronic devices based on the determined notification output sizes;

determine from the indication whether the originator of the electronic notification is on a stored list of originators; and in response to determining the originator is on the stored list of originators, transmit the electronic notification to the selected electronic device for output.

12. The system of claim 11, wherein the control circuitry is further configured to:
determine an audio output decibel level of each electronic device, wherein selecting the electronic device of the plurality of electronic devices is based on the determined notification output sizes and the determined audio output decibel levels.

13. The system of claim 11, wherein
the electronic device of the plurality of electronic devices comprises the notification output size that is the smallest of the determined output sizes.

* * * * *